Figure 1:
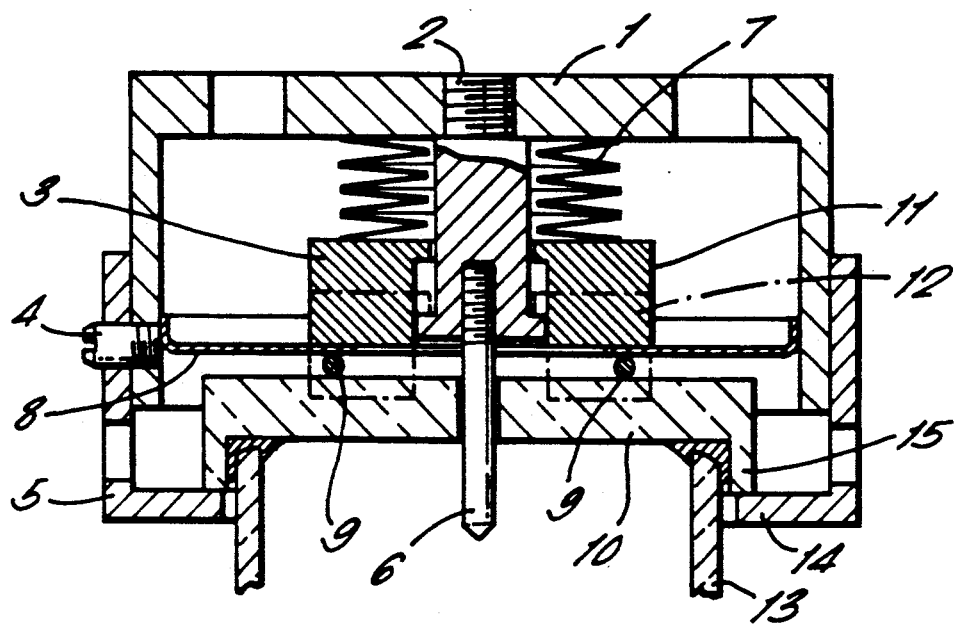

United States Patent [19]
Allen et al.

[11] Patent Number: 5,075,957
[45] Date of Patent: Dec. 31, 1991

[54] APPARATUS FOR CONSTRUCTING AN ALKALI METAL ENERGY CONVERSION DEVICE

[75] Inventors: Jeffrey Allen, Sale; John A. Pender, St. Helens; Stephen C. Rampton, Holmes Chapel; Stuart McLachlan, Northwich; Christopher O'Neil Bell, Great Sankey, all of Great Britain

[73] Assignee: Chloride Silent Power, Limited, England

[21] Appl. No.: 473,985
[22] PCT Filed: Oct. 24, 1988
[86] PCT No.: PCT/GB88/00910
§ 371 Date: Jun. 8, 1990
§ 102(e) Date: Jun. 8, 1990
[87] PCT Pub. No.: WO89/04069
PCT Pub. Date: May 5, 1989

[30] Foreign Application Priority Data
Oct. 23, 1987 [GB] United Kingdom ............... 8724817

[51] Int. Cl.⁵ .................. B23P 19/00; H01M 2/04
[52] U.S. Cl. ..................... 129/730; 429/104
[58] Field of Search ............. 29/730, 729, 623.2, 29/623.1; 429/104

[56] References Cited

U.S. PATENT DOCUMENTS

| | | |
|---|---|---|
| 3,153,581 | 10/1964 | Hutchins . |
| 3,941,297 | 3/1976 | Burns et al. . |
| 4,037,027 | 7/1977 | Desplanches et al. . |
| 4,088,258 | 5/1978 | Regalbuto . |
| 4,236,661 | 12/1980 | Dunn et al. . |
| 4,315,591 | 2/1982 | Houston . |
| 4,473,624 | 9/1984 | Hug et al. . |
| 4,530,151 | 7/1985 | Kagawa et al. ............... 429/104 X |
| 4,759,999 | 7/1988 | Maclachlan et al. ............... 429/104 |

FOREIGN PATENT DOCUMENTS

| | | |
|---|---|---|
| 0064656 | 11/1982 | European Pat. Off. . |
| 0135937 | 4/1985 | European Pat. Off. . |
| 0166605 | 1/1986 | European Pat. Off. . |
| 0280112 | 8/1988 | European Pat. Off. . |
| 2556279 | 6/1977 | Fed. Rep. of Germany . |
| 2333358 | 6/1977 | France . |
| 2447100 | 8/1980 | France . |
| 1292982 | 10/1972 | United Kingdom . |
| 2017389 | 10/1979 | United Kingdom . |
| 2102622 | 2/1983 | United Kingdom . |
| 2126774 | 3/1984 | United Kingdom . |

OTHER PUBLICATIONS

Patent Abstracts of Japan, vol. 10, No. 134 (M-479) (2191), May 1, 1986.

*Primary Examiner*—Anthony Skapars
*Attorney, Agent, or Firm*—Finnegan, Henderson, Farabow, Garrett & Dunner

[57] ABSTRACT

Apparatus for constructing an alkali metal energy conversion device, for example a sodium sulphur cell. Such cells typically employ a solid electrolyte element separating cathodic and anodic reactants which are liquid at the cell operating temperature.

7 Claims, 2 Drawing Sheets

APPARATUS FOR CONSTRUCTING AN ALKALI METAL ENERGY CONVERSION DEVICE

This invention relates to apparatus for constructing an alkali metal energy conversion device, for example an alkali metal cell and particularly a sodium sulphur cell. Such cells typically employ a solid electrolyte element separating cathodic and anodic reactants which are liquid at the cell operating temperature.

A known construction of device comprises an external casing, a solid electrolyte element dividing the interior of the casing into two electrode regions, an electrically insulating element joined to the electrolyte element, and at least one metal member sealed to the insulating element. This structure typically forms part of the sealing arrangement for the device, sealing off the two electrode regions both from each other and from the ambient environment. For example, the external casing of the device may be of metal, so that any sealing of an electrode region requires a seal to be made between the metal of the casing and the electrolyte element. However the metal of the casing must be electrically insulated from the electrolyte element and the insulation is provided by the intervening electrically insulating element.

An example of such an arrangment applied to a sodium sulphur cell is shown in GB-A-2102622 which has an alpha alumina lid closing a tubular electrolyte element. A centrally located current collector is mounted in an aperture through the alpha alumina lid and insulated by the lid from the electrolyte element. The outer electrode region, on the outside of the electrolyte element, is sealed by means of a metal closure member welded about its periphery to a metal casing for the cell, and sealed about an inner periphery to the alpha alumina lid. This latter seal between the metal closure member and the alpha alumina lid has sometimes been made by compression bonding using an intermediate layer, between the metal closure element and the ceramic lid, of a soft material, e.g. aluminium, to provide the necessary bonding.

Such bonding is carried out after the insulating element, i.e. the alpha alumina ceramic lid, is attached to the electrolyte element since this attachment is effected by glazing at elevated temperatures which would destroy seals manufactured by thermocompression bonding using an intermediate layer between the metal closure element and the ceramic lid.

Alternatively, EP-A-0166605 discloses the techniques of directly thermocompression bonding the metal member to the insulating ceramic lid to provide a seal between the two which is not adversely effected by subsequent temperature cycling such as may be employed if the insulating element is subsequently joined to the electrolyte element by glazing. The ability to form such a seal between the metal member and the insulating element before the latter is joined to the electrolyte element greatly facilitates the making of this seal. For instance, a stack of metal members and insulating elements may be simultaneously sealed to one another to provide a plurality of sealed pairs.

It will be appreciated that the sealing of sodium sulphur cells and other alkali metal energy conversion devices is of critical importance in the manufacture of the cell to ensure good performance and safety and is a particularly difficult problem because of the high operating temperatures of these cells, typically 350° C. Bonding techniques using cements have not proved practical.

The insulating ceramic element is typically formed of alpha alumina and is quite strong enough to withstand the substantial pressures exerted on it during the thermocompression bonding process. However, the electrolyte element, typically beta alumina, is relatively fragile and can easily be damaged during a thermocompression bonding process on an insulating element fastened thereto. Consequently, the bonding techniques used hitherto to secure the metal closure element or elements to the insulating element have of necessity been dependent upon whether the insulating element is itself joined to the solid electrolyte element as is the case when an intermediate layer, placed between the metal closure element and the ceramic lid, is utilised. Furthermore, the shape of such a composite insulating element and electrolyte element may make it necessary to perform the bonding of the metal elements to the insulating elements individually on a cell by cell basis.

The bonding techniques used hitherto have relied on pneumatic press rams, located within a treatment chamber, to apply the requisite bonding pressure. The components to be bonded together would, in such an arrangement, have to be loaded in the chamber, the temperature of the chamber then being raised to a temperature of between 550° C. and 600° C. Subsequently, the press rams would be activated to apply, over a relatively short period of time, a force sufficient to result in the components bonding together as required.

The use of pneumatic press rams results in certain disadvantages. For example, the treatment chamber cannot be a simple oven but must be arranged not only to hold the pneumatic press rams but also to be sufficiently strong to withstand the forces exerted by them.

In addition, certain problems have been encountered in scaling up such known arrangements for processing large numbers of components. When bonding is performed on a cell by cell basis, a large number of rams is required. However, ensuring the correct alignment of such an array of rams with respective cells and the control of such an array render an arrangement of this sort relatively complex and costly.

Furthermore, similar drawbacks are encountered on adapting such an arrangement to enable pass through processing.

In accordance with the invention, an apparatus for constructing an alkali metal energy conversion device having an external casing, a solid electrolyte element dividing the interior of the casing into two electrode regions, an electrically insulating element joined to the electrolyte element, and at least one metal member sealed to the insulating element, is characterised by means adapted to locate the insulating element and the metal member in a predetermined arrangement, and means, attached to the means adapted to locate, arranged to apply a force to press the metal member to the insulating element.

Consequently, the problems associated with having to use pneumatic press rams are entirely obviated. A simple oven may be used as the treatment chamber which may be readily adapted to allow pass through processing of energy conversion devices. Additionally, scaling up for the processing of large numbers of energy conversion devices may be readily effected by utilising a large number of apparatus all being loaded in or passed through the treatment chamber.

It will be appreciated that the term metal member used herein may refer not only to the outer metal member which is welded about its periphery to a metal casing for the cell to close off the outer electrode region, but also to the inner metal member which seals around the current collector mounted in an aperture of the alpha alumina lid.

Preferably, the means arranged to apply a force is adapted to directly apply said force to the metal member and the means adapted to locate comprises a flange arranged to contact a portion of the insulating element and fully support the load exerted on said insulating element by the means arranged to apply said force.

Consequently, the possibility of damaging the relatively fragile beta alumina electrolyte element during bonding is substantially reduced.

Preferably, the means adapted to locate comprises first and second mutually engageable and separable portions being one portion having the means arranged to apply a force attached thereto. In such an arrangement, the first separable portion may have the means arranged to apply a force attached thereto, and the second separable portion may comprise a first section including the said flange and a second section movable about the first section and adapted for engagement with the first separable portion. This arrangement is particularly advantageous where a bayonet fastening arrangement between the two separable portions is used since if the second section is movable in the direction of locking engagement of the bayonet fastening then torque is prevented from being exerted on the ceramic and seal assemblies during locking and unlocking.

Figure 2A:
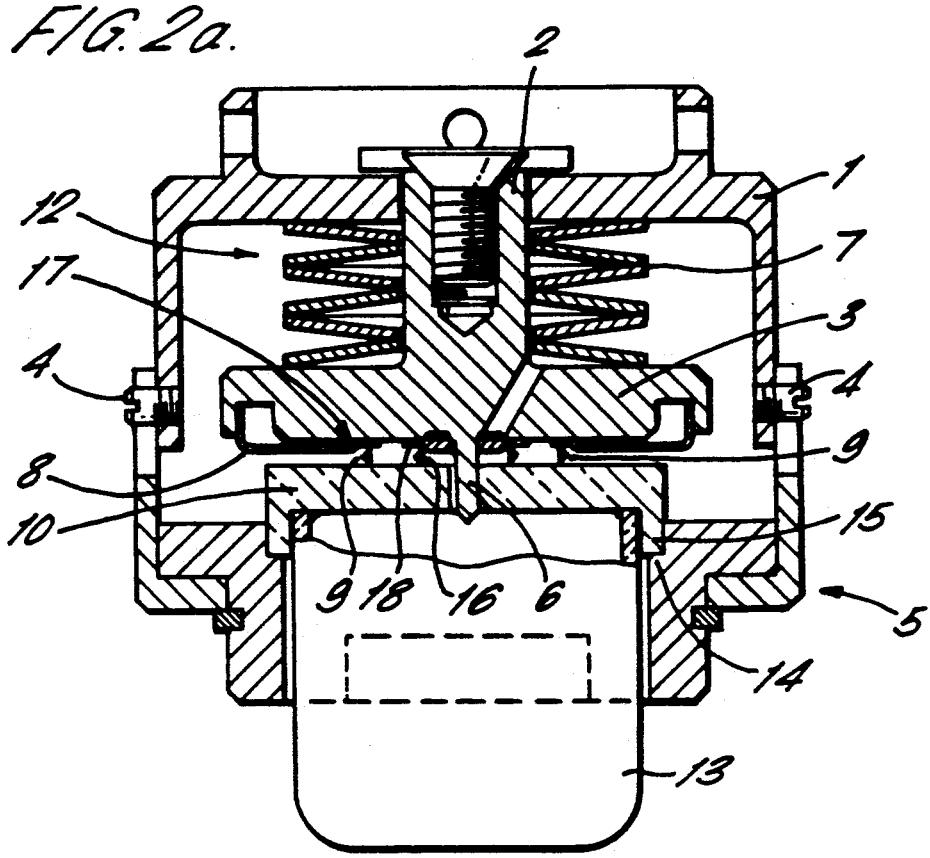
Figure 2B:
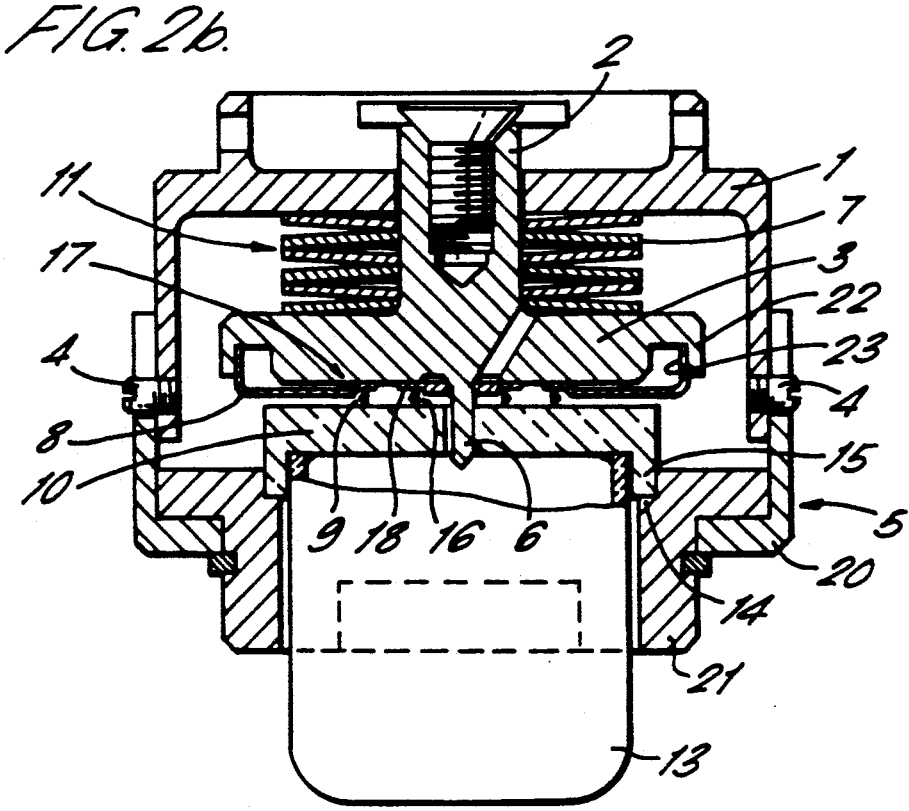

The invention will now be described by way of example with reference to the drawings in which FIG. 1 is a cross sectional view through an apparatus in accordance with the present invention; and FIGS. 2a and 2b are cross sectional views through another apparatus in accordance with the present invention.

Referring now to FIG. 1, a first portion 1 is shown engaged with a second portion 5, the two portions 1 and 5 being separable and respectively comprising male and female elements of a bayonet fastening. Three locating dogs, one 4 being shown, are set at 120° around the outer periphery of the first portion 1 and are secured in grooves in the second portion 5. Means arranged to apply a force comprises a set of eight high temperature annular disc springs 7, which may be of Nimonic 90, Nimonic 80A or Inconel X-750 arranged in a series on a centre pin 2, and further comprises a loading member 3. The means arranged to apply a force is attached to the first portion 1, and is arranged to apply the force to the outer metal member 8 of the alkali metal energy conversion device. The metal member is substantially annular and contacts an annular metal backing element 9 which is shaped in cross section to be substantially deformable. The backing element 9 is positioned intermediate the metal member 8 and an electrically insulating element 10 glazed to a solid electrolyte element shown partly at 13. The electrolyte element 13 is tubular and the metal member 8 has a central opening through which extends a cylindrical location pin 6 attached to the centre pin 2. Generally, the insulating element 10 is a disc shaped alpha alumina ceramic lid.

We refer now to FIGS. 2a and 2b, in which components corresponding to these already described with reference to FIG. 1 are given the same numerals. This embodiment differs from that illustrated in FIG. 1 in the following manner. Six high temperature annular disc springs are utilised, each being thicker than those used in the FIG. 1 embodiment. This arrangement provides increased loading with increased spring life. The centre pin 2 about which the disc springs are arranged in series is now integral with the loading member 3, an aperture being provided in the closed end surface of first portion 1 through which the centre pin can pass to allow the loading member 3 and springs 7 to move from an uncompressed position, indicated generally at 12 in FIG. 2a to a compressed position, indicated generally at II in FIG. 2b. The loading member 3 is shaped to aid the correct location of the metal member 8 on the insulating element 10 by incorporating a flange 22 co-operating with flange 23 of the metal member 8. A further difference is that the second portion 5 is comprised of two parts, a first section 21 including the flange 14 against which the flange 15 of the insulating element 10 presses, and a second section 20 which engages via the locating dogs 4 with the first portion 1. Second section 20 engages to first section 21 via a separate ring which allows the second section 20 to rotate around first section 21. This arrangement is particularly desirable since it prevents undesirable torque from being exerted on the ceramic or seal materials during the locating of the metal member 8 on the insulating element 10, i.e. during the locking and unlocking of the first and second portions.

In addition to the metal member 8 with metal backing element 9, a further inner metal member 18 with corresponding inner metal backing element 16 is also shown. Inner metal member 18 is adapted to seal around the current collector (not shown) which is inserted at a later stage through the aperture in the alpha alumina insulating element 10. Metal member 8 may be shaped to help properly position the backing element 9 with respect to the member 8. The shaping may comprise a ridge section 17 on the member 8.

A method of constructing an alkali metal energy conversion device will now be described with reference to the foregoing description of apparatus according to the invention shown in FIG. 1.

The electrically insulating element 10, having been glazed to the solid electrolyte element 13, is loaded into the second portion of the locating means 5.

An annular flange 15 extends from the outer periphery of the insulating element 10 and contacts an inwardly extending flange 14 of the second portion. The metal member 8 and intermediate metal backing element 9 may be loosely affixed to one another and the backing element further loosely affixed to the insulating element 10. The first portion 1 is subsequently lowered onto the second portion, the location pin 6 being passed through the central aperture of the insulating element 10. The two portions are then forced together, compressing the set of disc springs 7. The loading member 3 slides up centre pin 2 from an uncompressed position, indicated at 12, to a compressed position, indicated at 11. The first portion is then secured to the second portion by engaging the locating dogs, one 4 being shown, with co-operating grooves in a bayonet action. Consequently, the insulating element 10, the metal member 8 and the metal backing element 9 are intimately located together in a predetermined arrangement, the disc springs 7 exerting a force, via the loading member 3 to press the metal member to the insulating element.

The inner metal member 18 may be bonded at the same time as the metal member. In some circumstances, it may be more convenient to bond either one of the metal members 8, 18 alone.

The apparatus is loaded into a treatment chamber, the temperature within the chamber being raised to a peak temperature, held at that temperature, and subsequently reduced. The combination of the high temperature and compressive forces results in thermocompression bonding of the metal member 8, via the intermediate backing element 9, to the insulating element 10, at a narrow annular region at or near the inner periphery of the metal member 8.

A number of different materials combinations have resulted in satisfactory bonding and are further specified below:

| METAL MEMBER | METAL BACKING ELEMENT |
| --- | --- |
| 0.2% carbon steel with duplex chromium carbide surface layer | Aluminium silicon magnesium manganese alloy. |
| 0.2% carbon steel with duplex chromium nitride surface layer | Aluminium silicon magnesium manganese alloy. |
| C.P. Aluminium | Aluminium silicon magnesium manganese alloy. |

The following further materials may also be satisfactory for both the metal member and metal backing element:

Aluminium Manganese, Iron, Silicon
Aluminium Manganese Magnesium Chromium alloy
Aluminium Manganese Magnesium alloy
Aluminium copper
Aluminium 5.0% magnesium alloy
Aluminium 3.0% magnesium alloy It will be appreciated that these materials are also suitable for the inner metal member and inner metal backing element and that references to properties relating to the metal member and metal backing element extend also to properties relating to the inner metal member and inner metal backing element.

In addition, the following materials are suitable for the metal member:

Chromium coated steel
Copper coated steel
Aluminium coated steel
Nickel superalloys, such as Inconel 600,
Inconel 690 and Haynes 188

It is a purpose of correct materials selection to provide a corrosion resistant seal. It will be appreciated that the melting temperature of the material of the metal backing element 9 should be somewhat lower than that of the metal member 8 so that bonding may occur without any melting of the metal member material.

Additionally, the metal backing element 9 may preferably be shaped to be substantially deformably on applying the compressive force and subsequently heating. For instance, it may be shaped to contact the insulating element 10 and/or the metal member 9 with a tapering deformable portion.

Consequently, substantial disruption occurs to any surface oxide layer during the thermocompression bonding process, thereby promoting bonding. Typically, the cross section may be triangular or diamond shaped.

It will also be appreciated that the bonding temperature and pressure profile have to be carefully controlled. For bonding 0.2% carbon steel having either a duplex chromium carbide or chromium nitride surface layer using an aluminium silicon manganese magnesium alloy the following conditions have resulted in satisfactory bonds:

Bonding Temperature:
Ambient up to peak temperature at between 540° C. and 600° C.; a 2 hour hold at peak temperature; a 1 hour cool down to below 160° C. followed by air quenching.

Somewhat shorter holds at peak temperature with longer cool down periods have also been used successfuly.

Pressure:
Load of between 20 Kg and 40 Kg for an annular metal backing element of 20 mm diameter with a triangular cross section.

It will be appreciated that for higher temperatures than 600° C. the 2 hour hold period may be reduced and that for lower temperatures than 40° C., the hold period and/or the load may be increased.

In addition, the thermocompression bonding environment may be a partial vacuum of approximately $5 \times 10^{-2}$ mbar down to $1 \times 10^{-4}$ mbar. Alternatively, an inert gas environment such as obtained with argon may be utilised or a mildly reducing atmosphere at 5% hydrogen in argon. Fully reducing hydrogen atmosphere could also be used.

After thermocompression bonding has taken place to secure the metal member 8 to the insulating element 10, the sub-assembly of components of the energy conversion device thereby formed is removed from the apparatus so that the external casing (not shown) of the said device may be welded onto the metal member. Generally, welding is performed at the periphery of one end of the casing.

Further adaptation of the apparatus in accordance with the present invention may conveniently allow a plurality of pairs of insulating elements and metal members to be located in a predetermined arrangement to form a stack of said pairs of elements and members. It will be appreciated that such an adaptation is particularly suitable for the bonding of inner metal elements since such elements may be bonded to respective insulating elements prior to the glazing of an electrolyte element to back insulating element. Consequently, the stack may comprise pairs of inner metal elements and insulating elements.

We claim:

1. Apparatus for constructing an alkali metal energy conversion device having an external casing, a solid electrolyte element (13) dividing the interior of the casing into two electrode regions, an electrically insulating element (10) joined to the electrolyte element (13), and at least one metal member (8) sealed to the insulating element (10), characterised by means (1,2,5) adapted to locate the insulating element (10) close to the metal member (8), and means (7,3), attached to the means (1,2,5) adapted to locate, arranged to apply a force to press the metal member (8) to the insulating element (10).

2. Apparatus as claimed in claim 1, characterised in that means (7,3) arranged to apply a force is adapted to directly apply said force to the metal member (8).

3. Apparatus as claimed in claim 1 or claim 2, characterised in that the means adapted to locate comprises a flange (14) arranged to contact a portion of the insulating element (10) and fully support the load exerted on said insulating element (10) by the means (7,3) arranged to apply said force.

4. Apparatus as claimed in claim 3, characterised in that the means adapted to locate comprises first and second mutually engageable and separable portions (1,5), one portion having the means arranged to apply a force attached thereto.

5. Apparatus as claimed in claim 4, characterised in that said first and second portions respectively comprise male and female elements of a bayonet fastening.

6. Apparatus as claimed in any preceding claim, characterised in that means arranged to apply a force comprises high temperature disc springs (7).

7. Apparatus as claimed in any preceding claim, characterised in that the insulating element (10) has a circular central aperture and the means adapted to locate comprises a cylindrical location pin (6) for extending through said central aperture.

* * * * *